UNITED STATES PATENT OFFICE.

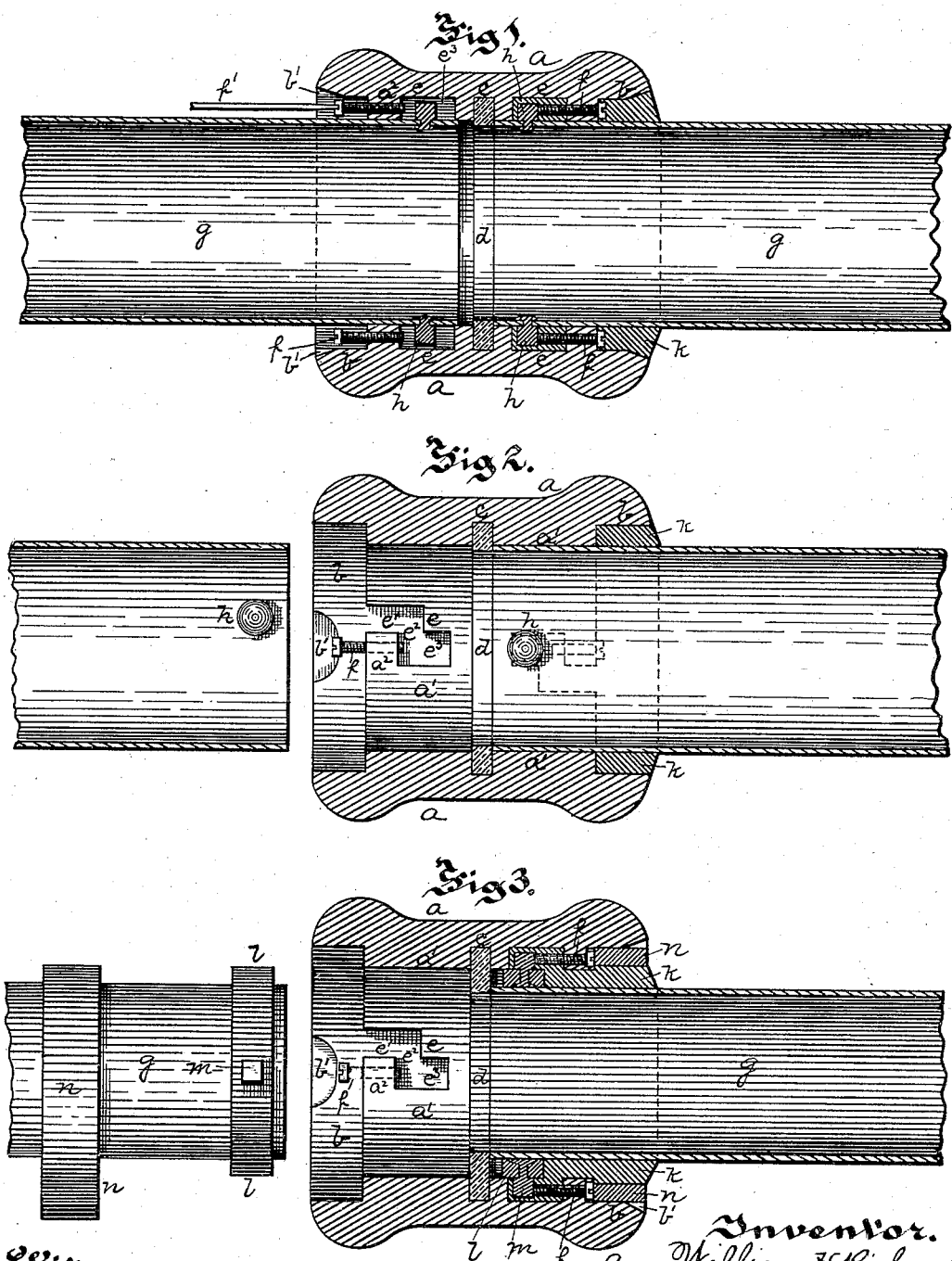

WILLIAM H. RICHARDS, OF McKEESPORT, ASSIGNOR TO EDMUND C. CONVERSE, OF ALLEGHENY CITY, PENNSYLVANIA.

PIPE-JOINT FOR GAS-MAINS.

SPECIFICATION forming part of Letters Patent No. 371,787, dated October 18, 1887.

Application filed June 14, 1886. Serial No. 205,046. (No model.)

*To all whom it may concern:*

Be it known that I, WILLIAM H. RICHARDS, of McKeesport, in the county of Allegheny and State of Pennsylvania, have invented a new and useful Improvement in Pipe-Joints for Gas-Mains; and I do hereby declare the following to be a full, clear, and exact description thereof.

My invention relates to couplings for gas and similar mains, its object being to provide a suitable joint for connecting the mains without the employment of screw-threads at the ends of the pipe, while providing for the easy connection of the tube-section and the coupling-collar to form a tight-joint in the center of the coupling-collar, and so prevent the leakage of the gas or other fluid, first, by means of a tight joint in the center of the coupling, and, second, by means of packing of lead or other material around the pipe at the ends of the coupling collar or sleeve. The coupling collar or sleeve in most general use for connecting tubing without threading the ends thereof is what is known as the "Converse lock-joint coupling," this coupling being formed of lugs on the tubing, and a coupling-collar having locking-recesses therein, with which said lugs engage, and a central ring formed integral with the coupling-collar, against which the ends of the pipe butt or bear, there being annular calking-recesses at the ends of the collar to receive lead or other calking material and form a tight joint between the coupling-collar and the tube-section. In these couplings no provision is made for forcing the tube-sections against the central ring, and even in case of such provision there would not be formed a gas or fluid tight joint between the ends of the tube-sections and the central ring, as it is made of cast metal and a tight joint could not be formed between it and the ends of the tube-sections. In this coupling, therefore, the gas would leak past the central ring and thence pass back along the outer face of the tube-sections between them and the interior of the coupling until it came in contact with the lead or other calking material at the end of the coupling-collar, the calking material at the end of the coupling thus forming the entire provision against leakage.

In Letters Patent granted to me the 16th day of March, 1886, No. 337,867, is shown a coupling-collar in which rubber gaskets are confined between an annular central ring integral with the coupling-collar and the ends of the tube-section for the purpose of forming a tight joint, the tube-sections being forced against the rubber gaskets by means of inclined slots into which lugs on the tube-sections entered; but in such construction it was found difficult to hold the tube-sections against these rubber gaskets, and as the tube-sections were turned in forcing them against the gaskets, and the gaskets were not sufficiently supported within the coupling-collar, they were liable to be forced out of place and thus render the joint inoperative. By my improvement these objections are substantially overcome.

It consists in combining with the tube-sections having lugs or rivets at or near the ends the coupling-collar provided with engaging-recesses within the interior of the coupling-collar for the reception of the lugs on the tubing and screw-bolts screwing against the lugs when within the recesses, and so holding the tube-sections within the coupling-collar, and, where an annular central rubber gasket is employed, forcing the pipe-sections against this rubber gasket to form a tight joint therewith.

It also consists in means for coupling the sections of small diameter in coupling collars of larger diameter, so providing for the coupling of pipes of different diameters without the casting of special coupling-collars for this purpose.

To enable others skilled in the art to make and use my invention, I will describe the same more fully, referring to the accompanying drawings, in which—

Figure 1 is a longitudinal central section of a joint illustrating my invention. Fig. 2 is a like view at right angles to Fig. 1; and Fig. 3 is a view illustrating the coupling of pipes of smaller diameter within a coupling-collar of larger diameter, as before referred to.

Like letters of reference indicate like parts in each.

The coupling collar or sleeve *a* is cast to shape, and is provided at the ends with the annular calking-recesses *b* and at the center with the annular groove *c*, within which is placed the annular gasket $d$, formed of rubber or similar elastic packing material, the gasket being thus supported within the walls of the coupling-collar, and being so firmly held that its displacement when the pipe-sections are forced against it is prevented. On the interior face, $a'$, of the coupling-collar are formed the engaging-recesses $e$, which extend from the calking-recesses $b$, first by an entering slot, $e'$, thence by a slot, $e^2$, at right angles thereto, and thence by a slot, $e^3$, parallel to the entrance-slot $e'$, which forms a pocket for the entrance of the lug on the tubing, as hereinafter described. Extending through the lug $a^2$, formed by the depressions of the engaging-recesses $e$ and the calking-recesses $b$, is the screw-bolt $f$, this screw-bolt passing through a threaded hole in the lug $a^2$ and being adapted to be screwed down into the engaging-recesses $e$. In order to provide means for the screwing of this bolt, I have enlarged the calking-recess $b$, as at $b'$, to give room at this point for the employment of a screw-driver, $f'$, or other suitable instrument with the head of the screw-bolt.

The pipe-sections $g$ are formed of wrought-metal tubing, having at or near the ends thereof the lugs or rivets $h$, these lugs being generally formed of rivets, the heads of which extend out on the interior of the pipe-sections, and those lugs enter the engaging-recesses $e$ when connection is made between the pipe-sections and the coupling-collar, the lugs first passing into the entrance-slots $e'$, thence through the slots $e^2$, and thence into the pockets $e^3$, and after passing into these pockets the screw-bolts $f$ are screwed up against the lugs, thus holding the lugs therein and preventing the withdrawal of the pipe-sections from the coupling-collar, the screw-bolts also serving, through the lugs $h$, to force the ends of the pipe-sections against the central rubber gasket, $d$, and form a tight joint between the ends of the pipe-sections, and this rubber gasket so preventing the escape of gas or other fluid past the central ring between the exterior of the pipe-sections and the interior wall, $a'$, of the coupling-sleeve. For many purposes the joint so formed by the pressure of the pipe-sections against the central gasket will be sufficient, and the employment of the annular recesses $b$, filled with lead or other calking material, may be dispensed with, or they may be only employed in case of leakage. Where the coupling is employed with gas-mains, however, it is as desirable to form as tight and permanent a joint as possible, and for this purpose I prefer to employ the lead or other calking material, $k$, in the calking-recesses $b$, the lead flowing around the body of the pipe and entering the engaging-recesses $e$ and inclosing the screw-bolts $f$, so preventing the escape of any gas which might leak past the annular central rubber gasket, and when calked within the recess forming a perfectly-tight joint. For the purposes of this class of mains, where the pipe-sections are subjected to expansion and contraction, it may be desirable to employ the screw-bolts simply to retain the lugs on the pipe-section within the coupling-collar, and instead of forcing the ends of the pipe-section against the rubber gasket sufficient space to permit of the contraction of the pipe may be left between the inner ends of the screw-bolts and the lugs.

When it is desired to employ a coupling-collar of a larger size to connect either pipe-sections of smaller diameter or one pipe-section corresponding to the size of the coupling-collar and another pipe-section of smaller diameter, I employ the means illustrated in Fig. 3, the coupling-collar shown therein being substantially the same as that shown in Figs. 1 and 2, but, according to the diameter of the pipe to be connected, a rubber or similar gasket of like diameter being inserted within the annular groove $c$ in the coupling-collar. In order to arrange the pipe-sections to fit the coupling-collar, I provide rings $l$, which are shrunken around the ends of the pipe-sections to be connected, these rings being provided with lugs or rivets $m$, which enter the engaging-recesses in the coupling-collar, the rings $l$ having an exterior diameter corresponding to the interior face, $a$, of the coupling-collar and an interior diameter corresponding to or slightly less than the exterior diameter of the tube-section, and the ring, therefore, fitting within the coupling-recess and increasing the diameter of the tube-section at that point to cause it to correspond with the diameter of the coupling-sleeve, so that a perfect joint is formed. In such case, if the screw-bolts are employed, they are screwed up against the lugs $m$, acting, as above described, in connection with the lugs or rivets on the pipe-sections, and the space between the body of the pipe-section and the interior of the coupling-collar is filled with lead or other calking material, thus forming a tight joint. As, however, the space required for the calking material in the ordinary coupling when connecting pipes of a diameter corresponding thereto would form a very large calking-recess, and one which would require a large amount of lead, I provide rings $n$, to fit within the calking-recesses $b$ of the coupling-collar, and so reduce the size of the calking-space around the tube-section of smaller diameter when coupled, as above described. These rings $n$ may either be formed in one piece and slipped onto the tube-section before the rings $l$, carrying the lugs $m$, are shrunken thereon or may be formed in two or more pieces and placed within the calking-recesses $b$ before the pouring of the lead or other calking material. By the employment of these rings carrying the engaging-lugs and the rings fitting the annular calking-space I am enabled to connect by means of the coupling-collar of large diameter tube-sections of smaller diameter, and so overcome the necessity of casting of special coupling-collars in cases where a small branch pipe or follower-pipe is to be connected with a pipe of larger diameter, these rings being kept on hand where the line of pipe is being laid, and so providing an easy means for connecting pipe of different diameters.

What I claim as my invention, and desire to secure by Letters Patent, is—

1. In combination with tubing having lugs or rivets at the ends, the coupling-collar provided with engaging-recesses for the reception of the lugs on the tubing and screw-bolts screwing against said lugs when within said recesses, substantially as and for the purposes set forth.

2. In combination with the tubing having the lugs or rivets at the ends, the coupling-collar provided with the engaging-recesses $e$, calking-recesses $b$, and central annular groove, $c$, the gasket $d$, and screw-bolts $f$, substantially as and for the purposes set forth.

3. In combination with the coupling-collar having engaging-recesses therein, the tube-section, and the rings $l$, secured around the same and provided with lugs engaging with the coupling-collar, substantially as and for the purpose set forth.

4. In combination with the coupling-collar having engaging-recesses therein and provided with annular calking-recesses at the ends, the tube-sections, the rings $l$, secured around the same and engaging with the coupling-collar, and the rings $n$, fitting within the annular calking-recesses, substantially as and for the purposes set forth.

In testimony whereof I, the said WILLIAM H. RICHARDS, have hereunto set my hand.

WILLIAM H. RICHARDS.

Witnesses:
PETER PATTERSON,
GEORGE MARS.